United States Patent

[11] 3,594,660

[72] Inventor George R. Huggett
 Sunnyvale, Calif.
[21] Appl. No. 756,252
[22] Filed Aug. 29, 1968
[45] Patented July 20, 1971
[73] Assignee Spectra-Physics, Inc.
 Mountain View, Calif.

[54] MODE-LOCKED LASERS
 1 Claim, 1 Drawing Fig.
[52] U.S. Cl..................................................... 331/94.5,
 350/160
[51] Int. Cl........................................................ H01s 3/00
[50] Field of Search............................................ 331/94.5

Primary Examiner—Roy Lake
Assistant Examiner—Darwin R. Hostetter
Attorney—Jerald E. Rosenblum ABSTRACT: A mode-locked laser in which a beat signal of the longitudinal modes is amplified and applied to an intraresonator modulator to form a self-oscillator for driving the modulator at a frequency which automatically changes to compensate for changes in mode spacing resulting from environmental perturbations of the resonator.

PATENTED JUL 20 1971 3,594,660
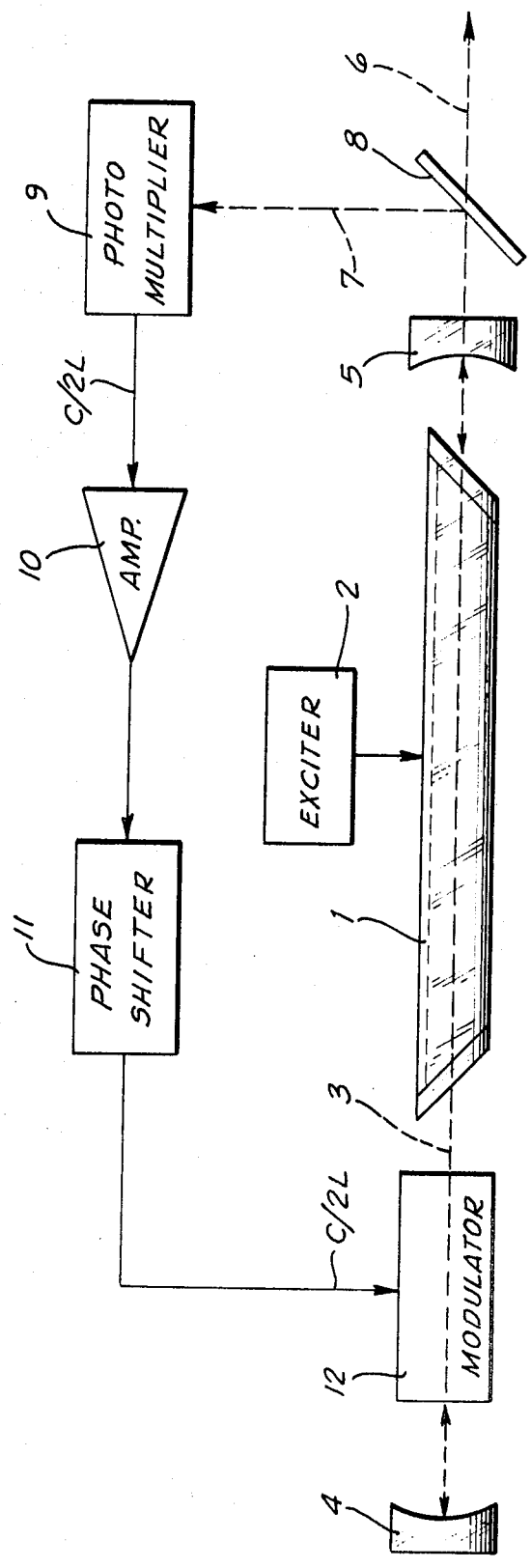
GEORGE R. HUGGETT
INVENTOR.
BY J. Rosenblum
ATTORNEY

MODE-LOCKED LASERS

BACKGROUND OF THE INVENTION

In a laser having an optical resonator comprising a pair of optically facing reflectors separated by a distance L, the laser output will, in general, consist of a plurality of optical frequencies distributed over the spectral fluorescence line of the active laser medium and separated in frequency by $c/2L$, where $c$ is the velocity of light. Each such output frequency corresponds to a longitudinal mode of the resonator. The nonlinear characteristics of the laser medium cause these longitudinal modes to couple, resulting in random fluctuations in the amplitude and phase of the laser output. If a time-dependent perturbation is applied to the resonator at the frequency $c/2L$ of the longitudinal mode spacing, the modes can be locked so that they oscillate with a well-defined phase and amplitude. The required perturbation for mode locking can be effected either by means of loss modulation or phase (dielectric) modulation of the optical radiation within the resonator. The mode-locked laser is characterized not only by lower noise characteristics, but also by a pulsed output in which the continuous output of the unlocked output is converted into a pulsed output of peak power equal to the average power times the number of longitudinal modes undergoing laser action. Such an output is useful for many applications, including parametric generation and pulse code modulated communications.

Heretofore, the maintenance of optimum mode-locking conditions over any substantial period of time has been difficult to achieve, in view of acoustical and thermal environmental disturbances resulting in changes in the resonator length L, and hence the mode spacing $c12L$.

SUMMARY OF THE INVENTION

In accordance with the present invention, the laser is dynamically mode locked by employing the laser as the controlling element in a self-oscillating servo-loop whereby the mode-locked condition is maintained independently of resonator perturbations and without need for further adjustment.

DESCRIPTION OF THE DRAWING

The various features and advantages of the present invention will become more apparent upon a consideration of the following description taken in connection with the accompanying drawing, which is a schematic diagram of a mode-locked laser in accordance with the present invention.

DESCRIPTION OF THE PREFERRED EMBODIMENT

In the drawing, a plasma tube 1 containing an active gaseous laser medium is energized by a discharge exciter 2 to emit optical radiation 3 which is retroreflected through the active medium by an optical resonator comprising a pair of optically facing mirrors or reflectors 4 and 5. Sufficient transmission is provided in the reflector 5 to form an output beam 6. A small portion 7 of the laser output is reflected by a beam splitter 8 to a photomultiplier tube 9. The photomultiplier tube 9, being a nonlinear detector of the various longitudinal modes in the laser output, generates an output containing the beat frequency $c/2L$ between said modes. This beat frequency signal is amplified by an amplifier 10 and fed back, via a phase shifter 11, as the driving signal of an electro-optic modulator 12 disposed within the laser resonator. With proper adjustment of the net phase shift around this feedback loop, via phase shifter 11, the $c/2L$ signal will be further amplified at a frequency that is regenerative. With the gain in the loop sufficiently high to exceed the losses and zero net phase shift around the loop, the system operates as a feedback oscillator at the mode separation frequency $c/2L$. Any changes in the mode separation frequency resulting from environmental perturbations of the optical resonator 4, 5 are automatically compensated by corresponding changes in the oscillation frequency which drives the mode-locking modulator 12.

In one example of the embodiment of the invention, a Model 125 helium–neon gas laser with 6,328 A. output, commercially available from Spectra-Physics, Inc. of Mountain View, Calif. was used with a single 0° z-cut KD*P crystal mounted in the resonator as the modulating element of the modulator 12. The crystal was 56 mm. long with AR-coated fused silica windows cemented on the ends thereof with index-matching cement to minimize resonator losses. To yield phase modulation, the crystal was oriented with one of its principal axes parallel the polarization direction of the laser radiation. The separation L between the reflectors 4 and 5 was 2.0 meters and the length of the plasma tube 1 was 1.8 meters. About 7 percent of the laser output was diverted into the beam 7 to the photomultiplier tube 9. The photomultiplier tube 9 was terminated into the 50 Ω input of a Hewlett-Packard HP 461A amplifier 10. The signal was further amplified by a Boonton 230A power amplifier which drove the modulator 12 through a pi-matching network having a Q of about 10. The tuning adjustment of this power amplifier provided the variable phase shifter 11 for the feedback loop. The optical output beam 6 was monitored by a Spectra-Physics Model 420 optical spectrum analyzer; the output of the photomultiplier tube 9 was monitored by an RF spectrum analyzer; and the output of the amplifier 10 was monitored on an oscilloscope. When the feedback loop to the modulator 12 was closed, the laser immediately became mode locked, as evidenced by the following indications: the displayed optical output spectrum changed from a random fluctuating pattern to the characteristic stable mode-locked pattern; the displayed amplifier output changed from a random beat signal to a constant CW beat signal at the mode separation frequency $c/2L$ of 75 megahertz; and the RF spectrum of the photomultiplier output also displayed a clean signal frequency beat signal. The output of the laser was in the form of 1 ¼ watt pulses of ½-nanosecond duration, the average output power being 50 milliwatts.

I claim:

1. A mode-locked laser, comprising: an active laser medium; means for exciting said medium to emit optical radiation; an optical resonator for multiply reflecting said radiation through said active medium to thereby generate laser radiation in at least two mode frequencies; means for applying a time-dependent perturbation to the laser radiation within said optical resonator at a frequency substantially equal to the frequency separation of said modes; nonlinear means responsive to said laser radiation for generating a beat signal of said modes; and means applying said beat signal to said perturbation means for maintaining an oscillation which drives said perturbation means at a frequency which automatically varies to compensate for changes in the frequency separation of said modes resulting from environmental perturbations of said optical resonator.